United States Patent [19]

Humphries

[11] Patent Number: 5,012,684

[45] Date of Patent: May 7, 1991

[54] LOAD DEFLECTION TESTING APPARATUS FOR GENERATOR SLOT WEDGES AND RIPPLE SPRINGS

[75] Inventor: Benjamin T. Humphries, Orlando, Fla.

[73] Assignee: Westinghouse Electric Corp., Pittsburgh, Pa.

[21] Appl. No.: 442,967

[22] Filed: Nov. 29, 1989

[51] Int. Cl.⁵ .......................... G01B 7/14; G01B 21/16
[52] U.S. Cl. ...................... 73/865.8; 33/656; 324/207.18
[58] Field of Search ................. 73/865.8, 865.9, 866.5; 324/158 MG, 551, 545, 207.18; 33/502, 556, 558, 558.01–558.09, 558.1–558.5, 559, 561, 542, 655, 656

[56] References Cited

U.S. PATENT DOCUMENTS

| | | | |
|---|---|---|---|
| 3,845,561 | 11/1974 | Elsdoester | 33/556 |
| 4,422,320 | 12/1983 | Moorby | 73/12 |
| 4,889,000 | 12/1989 | Jaafar et al. | 73/865.8 |
| 4,962,660 | 10/1990 | Dailey et al. | 73/865.8 X |

Primary Examiner—Tom Noland
Attorney, Agent, or Firm—Michael G. Panian

[57] ABSTRACT

Method and apparatus for measuring the tightness of generator stator slot wedges and ripple springs with the rotor still in place. A wedge block having a hydraulic cylinder disposed therein is installed within the upper of a pair of parallel grooves in the stator slot. The hydraulic cylinder is activated to press down on a load plate, which in turn contacts a slot wedge within the other pair of parallel grooves. This is turn compresses the ripple spring between the slot wedge and the stator windings. A load cell measures the force required to compress the ripple spring, while four linear variable differential transformers measure the amount of displacement of the slot wedge. These two measurements are then used to derive a measurement for the tightness of the slot wedge and the ripple spring.

20 Claims, 4 Drawing Sheets

LOAD DEFLECTION TESTING APPARATUS FOR GENERATOR SLOT WEDGES AND RIPPLE SPRINGS

TECHNICAL FIELD

The invention relates to electric generator stator coils and slot wedges, and more particularly to a method and apparatus for testing the deflection load of generator slot wedges and ripple springs.

BACKGROUND OF THE INVENTION

In a large electric generator stator coils are retained in slots within the stator, the coils are in turn held in place by stator wedges. The stator wedges are inserted within a pair of opposed parallel grooves on either side of the stator slot. Ripple springs are inserted between the stator wedges and the coils to maintain a positive load on the coils to thereby maintain a consistent pressure or preload on the stator coil of the stator. It is important to monitor the load on this ripple spring to insure that the pressure on the stator coil remains constant. Should the stator coils not be held to the proper tightness, insulation failure due to vibration caused by mechanical and magnetic loading can occur.

There are various methods and apparatuses to test the tightness of stator wedges and ripple springs. One method is to measure the load on the stator coil's ripple spring by first drilling several holes along the length of the stator wedge. At each of these holes, the measurement of the height of the ripple spring is taken. Once all measurements have been recorded and analyzed, the maximum height of the ripple spring and the load on the ripple spring can be determined. One drawback to this method is that for a typical generator having 405 stator slots with three spaced wedges along each slot, each wedge having seven holes therein, 8505 ripple spring readings must be made and recorded.

Application Ser. No. 403,419, filed on Sept. 1, 1989, discloses an automated prober for testing generator stator wedge tightness with the rotor in place; the above referenced application being assigned to the present assignee and incorporated herein by reference. In this apparatus, a probe is inserted through the stator wedge holes and contacts the peak of the ripple spring. An apparatus on a carriage measures the extension of the probe which is successfully aligned with several holes in the stator wedge to determine the degree of compression of the spring. Additionally, this carriage is insertable in the narrow gap between the rotor and the stator and selectively positionable adjacent each hole in the series of holes through the stator wedges.

Stator wedge tightness can be measured manually by pressing down on the slot wedge to determine the ripple spring load. However, presently known methods require the removal of the rotor prior to such testing, which is a lengthy and costly procedure. Several other prior art methods are available to test the tightness of stator wedges and ripple springs, such as tapping the stator wedge and feeling or listening to the response therefrom to make a judgement on stator wedge tightness. This method depends on the experience of the technician doing the measurement.

While the above methods are quite acceptable in determining the stator wedge and ripple spring tightness, it is desirable to have a system which does not require exact positional accuracy in order to insert a probe through a myriad of holes in the stator wedges. Furthermore, it is still desirable to have an apparatus which is insertable within the generator while the rotor is still in place.

DISCLOSURE OF THE INVENTION

It is therefore an object of the present invention to provide a method and apparatus to test the tightness of stator wedges and ripple springs either with or without the rotor in place.

It is a further object of the present invention to provide a method and apparatus which does not require exact positional accuracy within the stator slot.

The above objects are obtained by the present invention, according to which, briefly stated, in a dynamoelectric machine having a stator and a rotor separated by a narrow radial gap, the stator includes longitudinal slots having stator coils therein. The slots each have two pairs of generally parallel grooves in opposed side portions thereof, the coils being held in place by slot wedges inserted installed in one pair of the parallel grooves and ripple springs placed therebetween. An apparatus for determining the tightness of the slot wedges and the ripple springs comprises a wedge block adapted to be inserted into the other pair of parallel grooves, disposed radially inward of the one pair containing the slot wedges. A load plate is associated with the wedge block so as to be disposed between the slot wedge and the wedge block. Means for translating the slot wedge are provided so as to compress the ripple spring between the slot wedge and the coils, as well as means for measuring the displacement of the slot wedge in compressing the spring. Means for measuring the force required to compress the ripple spring are provided, together with means for determining the tightness of the slot wedge and the ripple spring based upon the amount of translation of the slot wedge and the force exerted by the ripple spring.

BRIEF DESCRIPTION OF THE DRAWINGS

Various other objects, features, and advantages of the invention will become more apparent by reading the following detailed description in conjunction with the drawings, which are shown by way of example only, wherein.

DESCRIPTION OF THE PREFERRED EMBODIMENT

Figure 1:
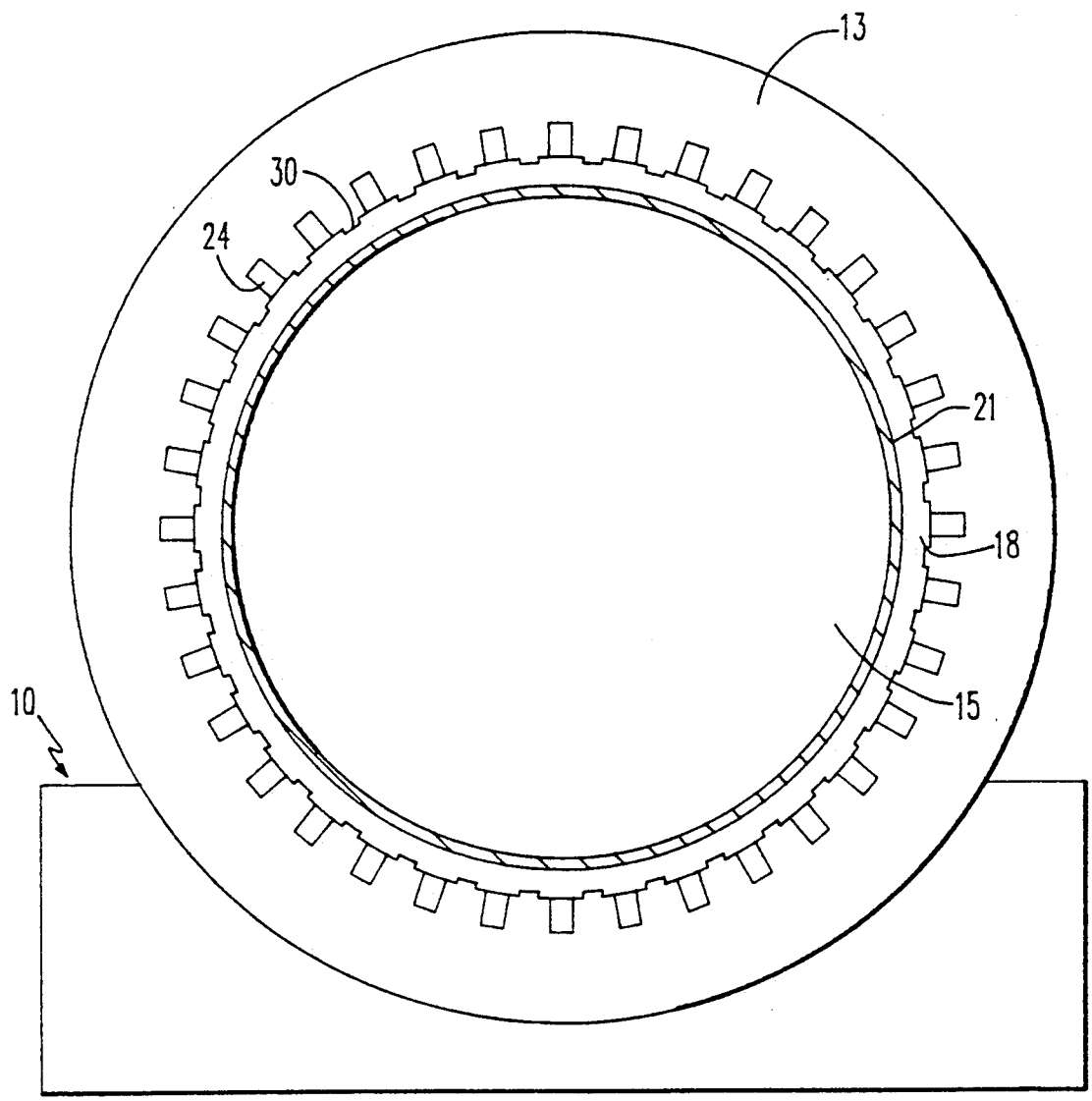
FIG. 1 is a schematic cross sectional view of a generator having the rotor installed within the stator.
Figure 2:
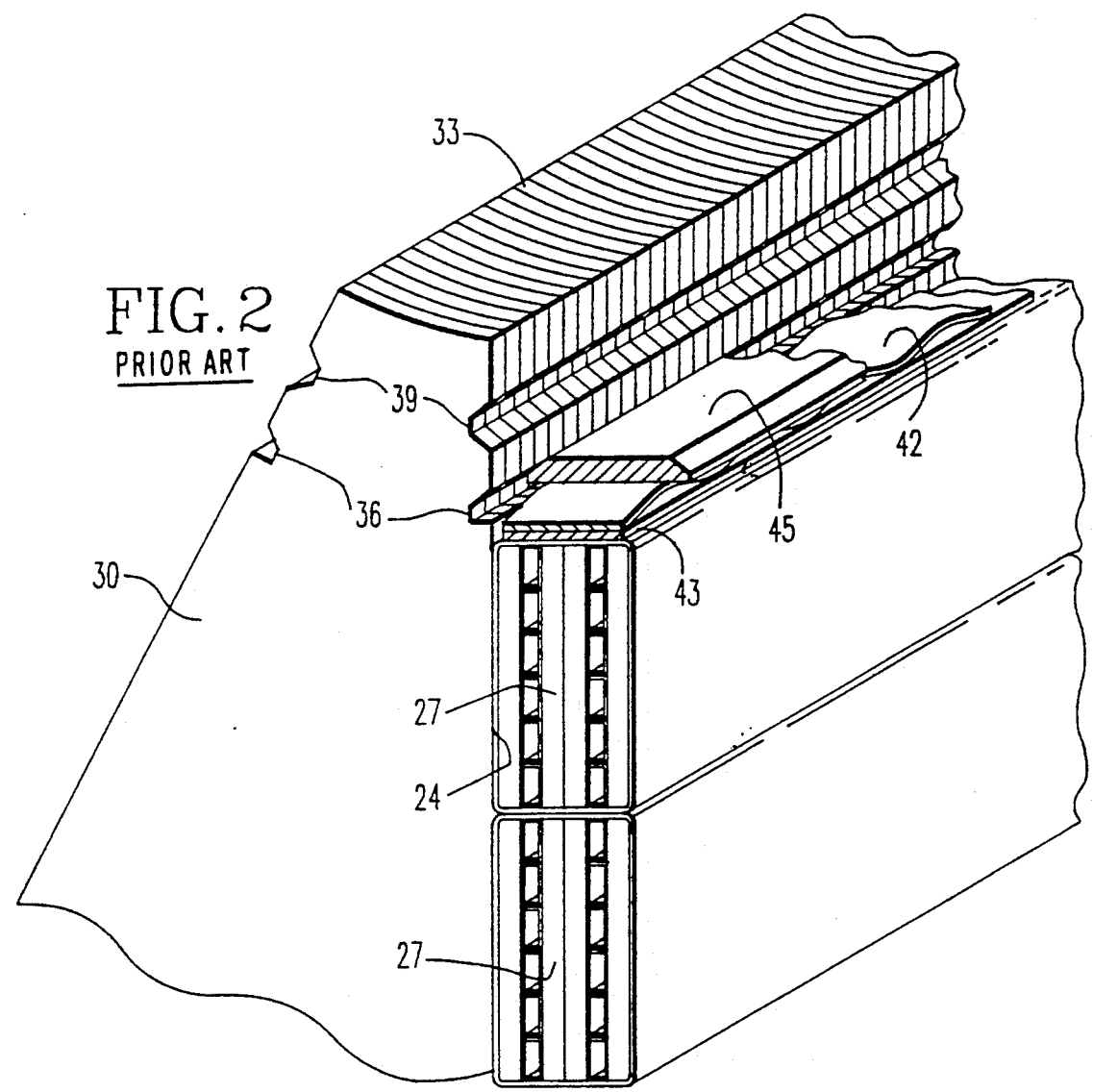
FIG. 2 is a partial isometric view of a portion of the stator of the generator of FIG. 1, showing the manner in which coils are held within the stator slot.

Referring now to the drawings in detail, FIG. 1 shows a cross sectional view of a large turbine generator 10 having a stator 13 surrounding a rotor 15 disposed therein. A narrow radial gap 18 (somewhat exaggerated in the figure) exists between the stator 13 and a retaining ring 21 disposed about the rotor 15. The stator 13 includes a plurality of stator slots 24 within which stator coils 27 are placed. FIG. 2 shows the contents of a typical stator slot 24 in detail. Each stator slot 24 is formed by the presence of a stator tooth 30 on either side thereof, one tooth 30 being shown in FIG. 2. The stator 13 is typically made of a plurality of stamped laminations 33. Each stator tooth 30 has on the inside surface thereof two (2) grooves 36,39 which are radially disposed with respect to each other. Thus each stator slot 24 includes two (2) pairs of generally parallel grooves therein.

Typically two (2) stator coils 27 are stacked within stator slot 24, one on top of the other. A ripple spring 42 is then inserted within the slot 24 on top of the stator coils 27. A shim 43 is typically placed between the spring 42 and the coil 27. Finally one or more stator slot wedges 45 are installed within the slot 24 by sliding the wedge 45 in the one pair of parallel grooves 36 disposed radially outward with respect to the stator tooth 30. The slot wedges 45 compress the spring 42 against the stator coils 27 to insure tightness and to prevent vibration due to mechanical and magnetic loading of the coils 27.

Figure 4:
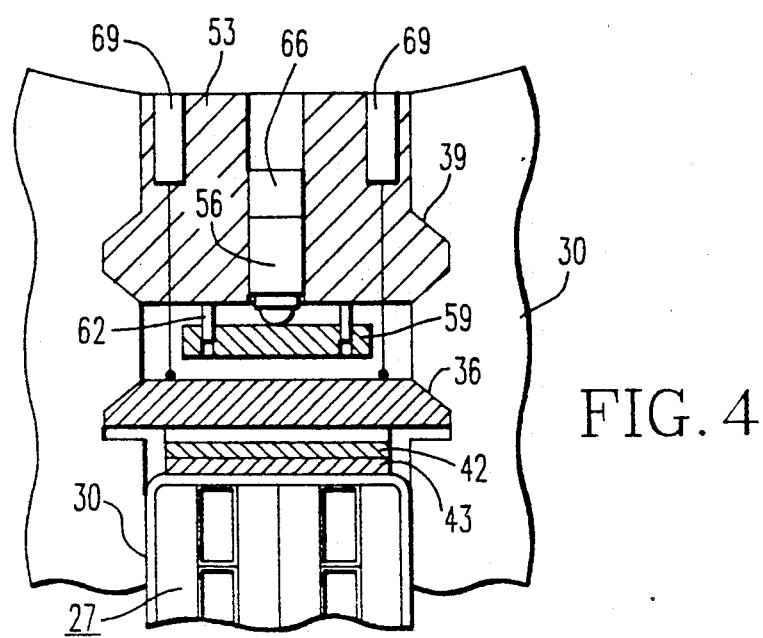
FIG. 4 is a cross sectional view of the load deflection tester of FIG. 3.
Figure 3:
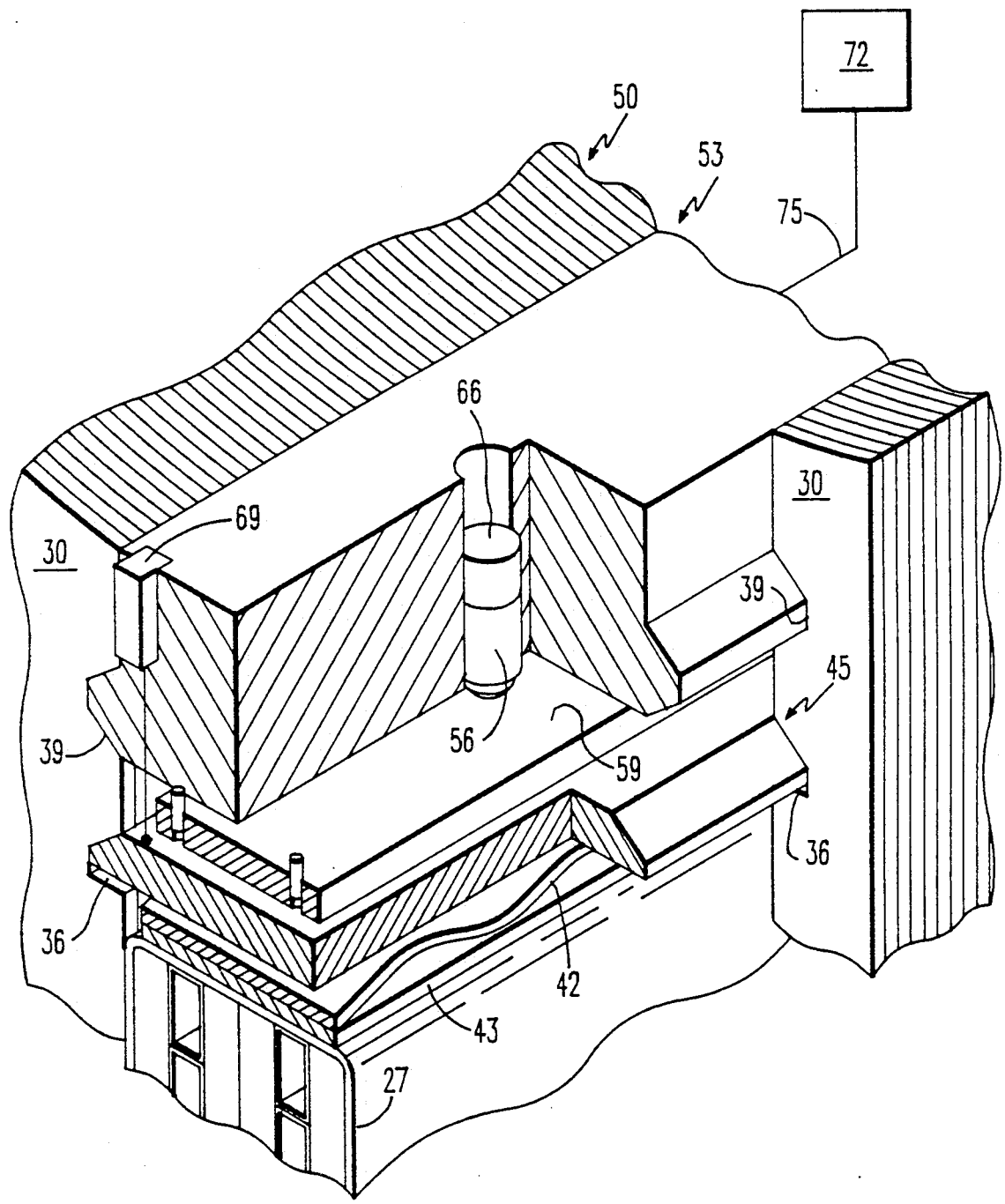
FIG. 3 is a further partial isometric view of the stator slot having the load deflection tester of the present invention therein.

It is important to test and measure the load on the stator coil 27 provided by the stator wedge 45 and the ripple spring 42. In order to do so while the rotor 15 remains in place, the load deflection tester 50 for generator slot wedges 45 and ripple springs 42 of the present invention is provided. As shown in FIGS. 3 and 4, the load test device 50 comprises a wedge block 53 which is adapted to be installed within the other pair of parallel grooves 39 within the stator slot 24, that which is positioned radially inward of the one pair 36 wherein the slot wedge 45 is installed. The wedge block 53 has disposed therein a hydraulic cylinder 56, or other means for exerting a force on the slot wedge 45 so as to translate it radially outward to compress the ripple spring 42 between the slot wedge 45 and the stator coil 27. In order to provide for uniform loading, a load plate 59 is disposed between the slot wedge 45 and the wedge block 53. Preferably the load plate 59 is associated with the wedge block 53 by a plurality of guide pins 62 holding the load plate 59 in a position with respect to the wedge block 53. A load cell 66 is associated with the hydraulic cylinder 56 in order to measure the force exerted on the slot wedge 45, and required to compress the ripple spring 42. Alternatively, this load can also be measured based upon the pressure in the hydraulic cylinder 56.

In order to measure the amount of displacement of the slot wedge 45 in compressing the ripple spring 42, a plurality of linear variable displacement transducers 69 (LVDTs) are provided. Preferably four (4) LVDTs 69 are provided, one at each corner of the wedge block 53, so as to measure the displacement of the slot wedge 45 (i.e., downward in the figure) by the load plate 59. The LVDTs 69 are preferably positioned on the wedge block 53 such that they are outside the area occupied by the load plate 59. In this manner, the arms 70 of the LVDTs 69 rest on the top of slot wedge 45 and move with it as the wedge is translated, radially outward with respect to the stator 13, to compress the ripple spring 42. Alternatively, an eddy current non-contact probe may be used to measure the displacement of the slot wedge 45 and/or the load plate 59. The wedge block 53 serves as a fixed medium to enable a determination of the load on the stator coil 27 by measuring the amount of displacement of the stator wedge 45, and the force applied to the slot wedge required to compress the ripple spring 42. This force is a direct measurement, then, of the preload on the stator coils 27.

The data received from the LVDTs 69 and the load cell 66 are preferably sent to a computer based data acquisition system 72. A tether line 75 connects the load cell 66 and the LVDTs 69 to the remotely located data acquisition system 72. By comparing the amount of displacement of the slot wedge 45 with the force required to compress the ripple spring 42, the stator wedge 45 tightness, or stiffness, can be determined. This stiffness is also a measure of the preload placed on the coils 27 by the ripple springs 42. The data acquisition system 75 includes pass/fail criteria for the ripple springs 42 and stator wedges 45 and automatically records the location of the wedge 45 tested and its loading acceptability.

Figure 5A:
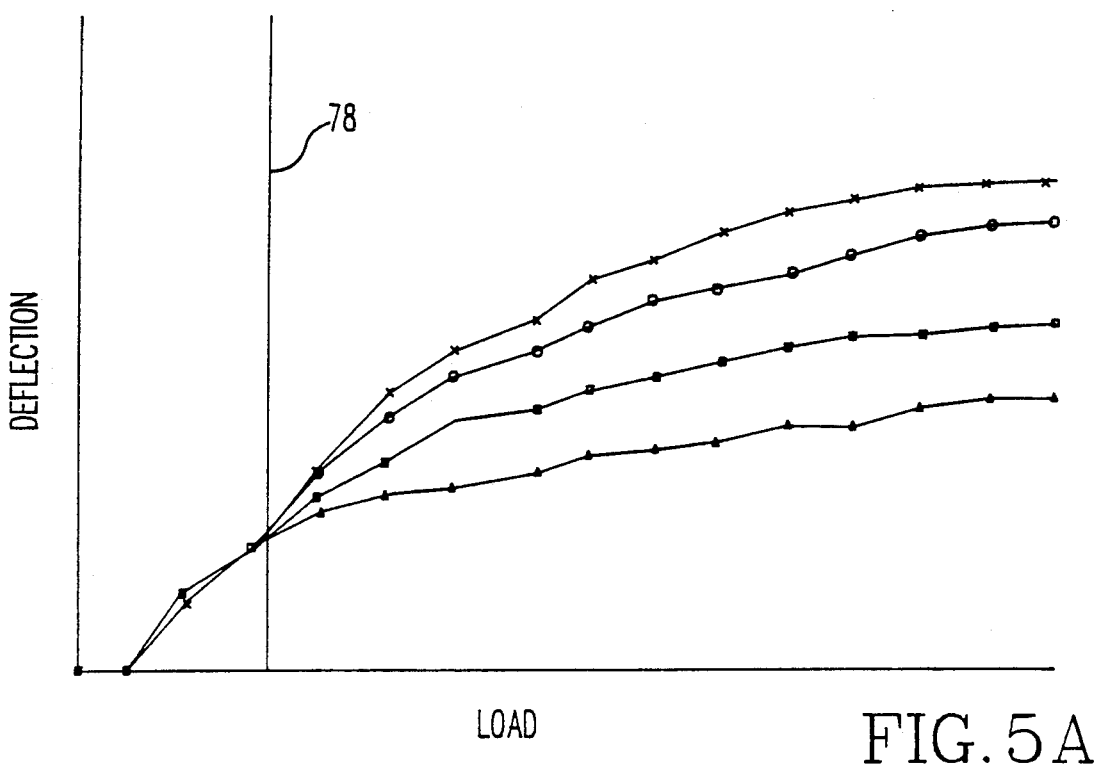
FIGS. 5A and 5B are representative graphs of typical outputs showing, respectively, acceptable and unacceptable slot wedge tests.
Figure 5B:
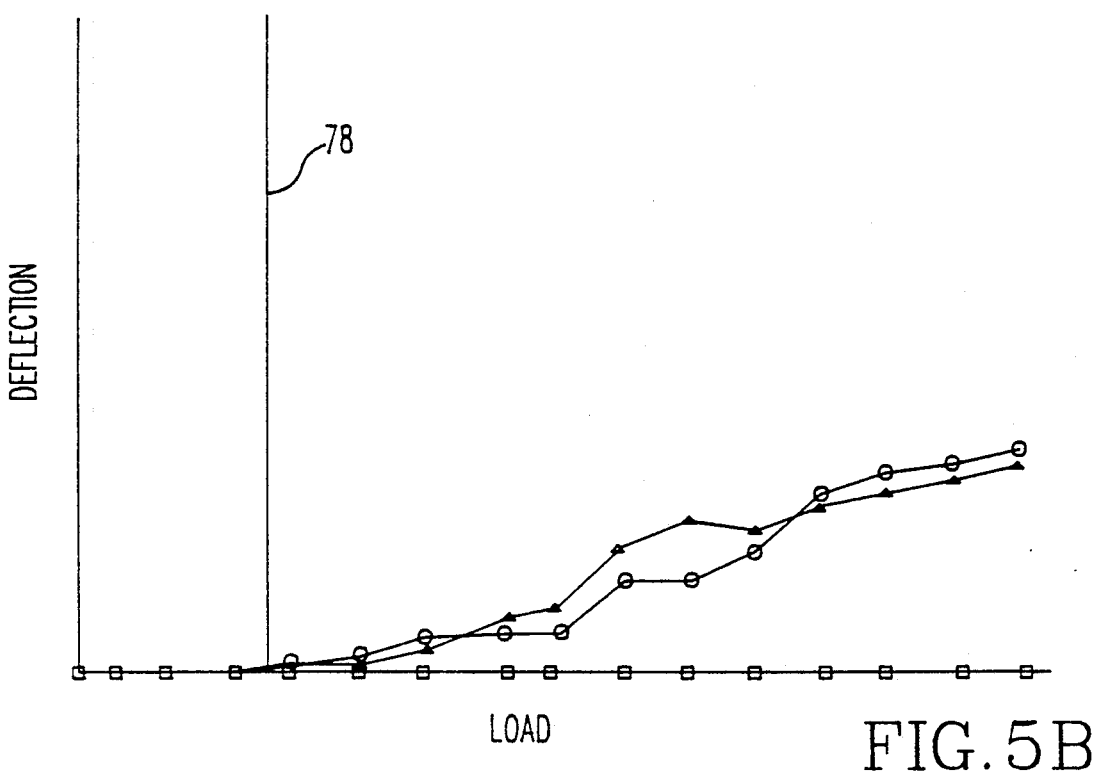

A graphical representation of typical readings obtained by the load deflection tester 50 is shown in FIGS. 5A and 5B. FIG. 5A is representative of the output received from an acceptable, or good, stator wedge and spring arrangement, whereas FIG. 5B is representative of an unacceptable, or bad, wedge tightness measurement. In the figures, the horizontal axis is load exerted on the slot wedge 45 (or that needed to compress the ripple spring 42), and the vertical axis is the displacement of the slot wedge 45 as sensed by the LVDTs 69. The vertical line 78 indicates the expected minimum load necessary to compress the spring under normal conditions. As can readily be seen, in FIG. 5A the LVDTs register practically no displacement until the minimum load level 78 is reached, as sensed by the load cell 66. Moreover, after this point, only two of the four displacement sensors indicate any translation, even at the application of a large force. However in FIG. 5B, displacement is sensed early on by the LVDTs. The wedge is displaced at a point below the minimum load level, and the ripple spring is easily compressed.

The wedge block 53 is designed to permit the entire arrangement to slide along the length of the stator wedge 45 in order to test the tightness of the ripple springs 42 and slot wedges 45 along the entire longitudinal length of the generator 10. The wedge block 53 can be positioned within the stator slot 24 and its longitudinal position recorded. Since the wedge block 53 can completely cover the surface of a stator wedge 45, with the load tester 50 of the present invention it is not necessary to accurately position a probe over a relatively small hole and take thousands of readings therefrom. The hydraulic cylinder 56 is capable of compressing the ripple spring 42 over the area defined by the wedge block 53 and the overall tightness of the stator wedge 45 and ripple spring 42 can be recorded. Thus, the hydraulic cylinder 56 need only be activated once in order to test a larger length of the ripple spring 42.

In order to test the entire longitudinal length of the stator slot 24, the following steps may be performed. The wedge block 53 is inserted into the outer pair of grooves 39. As the wedge block is inserted, the arms 70 of the LVDTs 69 ride along the surface of the stator wedge 45. When the end of a particular wedge is reached, the displacement sensors will indicate this by the sensing of the crack between adjacent wedges. Since the dimensions of the slot wedges 45, as well as the wedge block 53 and the LVDTs 69 disposed thereon, are known, the longitudinal position of the tester 50 within the slot 24 can be identified, along with the particular wedge and spring which are to be tested. Generally, the spring is the same length as the wedge, such that a particular slot wedge and ripple spring combination can be tested together. With the tester 50 in the desired position, the hydraulic cylinder 56 is activated to engage the load plate 59, in order to translate the slot wedge 45 radially outward, thereby compressing the ripple spring 42 between the wedge and the coil 27. As the slot wedge 45 is displaced, the LVDTs 69 measure that displacement, while the load cell 66 associated with the hydraulic cylinder 56 measures the force applied to compress the ripple spring 42, if indeed the stator wedge is displaced (see FIG. 5). When the test is complete, the wedge block 53 is then moved along the stator slot 24 until the next wedge is encountered. Testing is performed in the above manner until all the slots have been inspected.

The present invention offers a direct measurement of the stator coil 27 preload, without having to perform indirect calculations based upon the height of the ripple spring 45, for example. Therefore, the load deflection tester 50 of the present invention allows for more rapid measurement of the ripple spring 42 stiffness.

While specific embodiments of the invention have been described in detail, it will be appreciated by those skilled in the art that various modifications and alterations would be developed in light of the overall teachings of the disclosure. Accordingly, particular arrangements disclosed are meant to be illustrative only and not limiting as to the scope of the invention which is to be given the full breadth of the appended claims and in any and all equivalents thereof.

What is claimed is:

1. In a dynamo-electric machine having a stator including longitudinal slots having stator coils therein, said slots having two pairs of generally parallel grooves in opposed side portions thereof, said coils being held in place by slot wedges inserted in one pair of said parallel grooves and ripple springs therebetween, an apparatus for determining the tightness of said slot wedges and ripple springs, the apparatus comprising:
    a wedge block adapted to be inserted into the other pair of said parallel grooves disposed radially inward of the one pair;
    means cooperatively associated with said wedge block for displacing said slot wedge radially outward with respect to the stator so as to compress said ripple spring;
    means cooperatively associated with said wedge block for measuring the displacement of said slot wedge in compressing said ripple spring; and
    means for measuring the force required to compress said ripple spring, whereby the tightness of said slot wedge and said ripple spring is determined based upon the amount of displacement of said slot wedge and the force exerted by the ripple spring.

2. The apparatus as recited in claim 1, wherein said means for measuring the displacement of said slot wedge comprises a linear variable differential transformer (LVDT).

3. The apparatus as recited in claim 1, wherein said means for displacing said slot wedge so as to compress said ripple spring comprises an hydraulic cylinder and a load plate, the load plate disposed between the wedge block and said slot wedge such that the hydraulic cylinder forces the load plate into contact with said slot wedge.

4. The apparatus as recited in claim 3, wherein said means for measuring the force required to compress said ripple spring comprises a load cell operably associated with the hydraulic cylinder.

5. The apparatus as recited in claim 1, wherein said means for measuring the force required to compress said ripple spring comprises a load cell operably associated with said means for displacing said slot wedge so as to compress, said ripple spring.

6. The apparatus as recited in claim 1, further comprising means for longitudinally translating the wedge block within said slot.

7. The apparatus as recited in claim 6, further comprising means for determining the longitudinal position of the wedge block within said slot.

8. The apparatus as recited in claim 7, wherein said means for measuring the displacement of said slot wedge comprises a linear variable differential transformer (LVDT).

9. The apparatus as recited in claim 8, wherein said means for displacing said slot wedge so as to compress said ripple spring comprises an hydraulic cylinder and a load plate, the load plate disposed between the wedge block and said slot wedge such that the hydraulic cylinder forces the load plate into contact with said slot wedge.

10. The apparatus as recited in claim 9, wherein said means for measuring the force required to compress said ripple spring comprises a load cell operably associated with the hydraulic cylinder.

11. In an electric generator having a stator and a rotor separated by a narrow radial gap, the stator including longitudinal slots having stator coils therein, said slots having two pairs of generally parallel grooves in opposed side portions thereof, said coils being held in place by slot wedges inserted in one pair of said parallel grooves and ripple springs therebetween, an apparatus for determining the tightness of said slot wedges and ripple springs, the apparatus comprising:
    a wedge block adapted to be inserted into the other pair of said parallel grooves disposed radially inward of the one pair;
    a hydraulic cylinder cooperatively associated with said wedge block for translating said slot wedge radially outward with respect to the stator so as to compress said ripple spring;
    means cooperatively associated with said wedge block for measuring the translation of said slot wedge in compressing said ripple spring;
    a load cell operably associated with the hydraulic cylinder for measuring the force required to compress said ripple spring, whereby the tightness of said slot wedge and said ripple spring is determined based upon the amount of translation of said slot wedge and the force exerted by the ripple spring.

12. The apparatus as recited in claim 11, wherein said means for measuring the translation of said slot wedge comprises a plurality of linear variable differential transformers (LVDTs) disposed between the wedge block and said slot wedge.

13. The apparatus as recited in claim 12, further comprising a load plate disposed between the wedge block and said slot wedge such that the hydraulic cylinder forces the load plate into contact with said slot wedge so as to compress the ripple spring.

14. The apparatus as recited in claim 11, wherein said wedge block is adapted to be inserted within the narrow radial gap between the rotor and the stator.

15. The apparatus as recited in claim 14, further comprising means for longitudinally translating the wedge block within said slot.

16. The apparatus as recited in claim 15, further comprising means for determining the longitudinal position of the wedge block within said slot.

17. The apparatus as recited in claim 16, wherein said means for measuring the translation of said slot wedge comprises four (4) linear variable differential transformers (LVDTs), one each disposed at a corner of the wedge block and associated with said slot wedge.

18. The apparatus as recited in claim 17, wherein said means for translating said slot wedge so as to compress said ripple spring comprises an hydraulic cylinder and a load plate, the load plate disposed between the wedge block and said slot wedge such that the hydraulic cylinder forces the load plate into contact with said slot wedge.

19. In an electric generator having a stator and a rotor, the stator including longitudinal slots having stator coils therein, said slots having at least one pair generally parallel grooves in opposed side portions thereof, said coils being held in place by slot wedges inserted in said pair of parallel grooves and ripple springs disposed therebetween, a method of determining the tightness of said slot wedges and ripple springs, said method comprising the steps of:

translating said slot wedge radially outward so as to compress the ripple spring thereunder;

measuring the translation of said slot wedge in compressing the ripple spring;

measuring the force required to compress the ripple spring; and determining the tightness of said slot wedge and the ripple spring based upon the translation of said slot wedge and the force required to compress the ripple spring.

20. The method as recited in claim 19, wherein the step of translating said slot wedge radially outward further comprises the steps of inserting a wedge block into a second pair of said parallel grooves disposed radially inward of the one pair, the wedge block having a load plate associated therewith so as to be disposed between said slot wedge and said wedge block, and translating the load plate into contact with said slot wedge so as to compress the ripple spring.

* * * * *